(12) United States Patent
Ijzerman et al.

(10) Patent No.: US 7,798,648 B2
(45) Date of Patent: Sep. 21, 2010

(54) OPTICAL PATH LENGTH ADJUSTER

(75) Inventors: Willem L. Ijzerman, Eindhoven (NL); Marcellinus P. C. M. Krijn, Eindhoven (NL); Bart A. Salters, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1082 days.

(21) Appl. No.: 10/596,882

(22) PCT Filed: Jan. 6, 2005

(86) PCT No.: PCT/IB2005/050080

§ 371 (c)(1),
(2), (4) Date: Jun. 28, 2006

(87) PCT Pub. No.: WO2005/069058

PCT Pub. Date: Jul. 28, 2005

(65) Prior Publication Data
US 2009/0021824 A1 Jan. 22, 2009

(30) Foreign Application Priority Data
Jan. 9, 2004 (GB) .................. 0400372.9

(51) Int. Cl.
G03B 21/00 (2006.01)
(52) U.S. Cl. .......................... 353/7; 359/303
(58) Field of Classification Search .......... 353/7, 353/8; 359/465, 471, 303, 320; 345/6
See application file for complete search history.

(56) References Cited

U.S. PATENT DOCUMENTS

| 4,674,837 | A |   | 6/1987  | Knuttel et al. |
| 5,128,797 | A |   | 7/1992  | Sachse et al. |
| 5,329,118 | A | * | 7/1994  | Riza ....................... 250/227.12 |
| 5,475,525 | A | * | 12/1995 | Tournois et al. ............. 359/245 |
| 5,969,850 | A |   | 10/1999 | Harrold et al. |
| 6,377,229 | B1 | * | 4/2002 | Sullivan ........................ 345/6 |
| 7,002,532 | B2 | * | 2/2006 | Suyama et al. ................. 345/6 |
| 2003/0067421 | A1 |   | 4/2003 | Sullivan |

FOREIGN PATENT DOCUMENTS

| EP | 0435296 A1 | 7/1991 |
| EP | 0959377 A2 | 11/1999 |
| WO | 9908145 A1 | 2/1999 |

OTHER PUBLICATIONS

Shiro Suyama et al, "Three-Dimensional Display System With Dual-Frequency Liquid-Crystal Varifocal Lens", Jpn. J. Appl. Phys., vol. 39, Feb. 2000, pp. 480-484.

* cited by examiner

*Primary Examiner*—Georgia Y Epps
*Assistant Examiner*—Jerry Brooks

(57) ABSTRACT

An optical path length adjuster enables electro-optical control of a physical path length between two optical elements, suitable for use in the adjustment of an optical path length within three dimensional display devices that generate a virtual image within a defined imaging volume. The adjuster varies an optical path length between an input optical path and an output optical path and includes: a first polarization switch for selecting a polarization state for an input beam on the input optical path; first and second beam splitters having at least two possible optical paths of different lengths therebetween, for passing the input beam along a selected one of said at least two possible optical paths according to the selected polarization state of the input beam and for providing an output beam of light, on said optical output path, that has traveled along the selected optical path.

25 Claims, 10 Drawing Sheets

OPTICAL PATH LENGTH ADJUSTER

The present invention relates to methods and apparatus for adjusting an optical path length between two optical elements. In particular, though not exclusively, the invention relates to adjustment of an optical path length within three dimensional display devices that generate a virtual image within a defined imaging volume.

A three-dimensional image can be created in several ways. For instance, in stereoscopic displays two pictures uniquely observable by each of a viewer's eyes can be shown simultaneously or time-multiplexed. The pictures are selected by means of special spectacles or goggles worn by the viewer. In the former case, the spectacles may be equipped with Polaroid lenses. In the latter case, the spectacles may be equipped with electronically controlled shutters. These types of displays are relatively simple to construct and have a low data-rate. However, the use of special viewing spectacles is inconvenient and the lack of motion parallax may result in discomfort among viewers.

A more realistic three-dimensional impression can be created using an auto-stereoscopic display. In these types of display, every pixel emits light with different intensities in different viewing directions. The number of viewing directions should be sufficiently large that each of the viewer's eyes sees a different picture. These types of display show a realistic motion parallax; if the viewer's head moves, the view changes accordingly.

Most of these types of display are technically difficult to realise in practice. Several proposals can be found in the literature, see for instance U.S. Pat. No. 5,969,850. The advantage of these displays is that a number of viewers can watch, e.g. a single 3D television display without special viewing spectacles and each viewer can see a realistic three-dimensional picture including parallax and perspective.

Another type of 3D display is a volumetric display as described at http://www.cs.berkley.edu/jfc/MURI/LC-display. In a volumetric display, points in an image display volume emit light. In this way, an image of a three dimensional object can be created. A disadvantage of this technique is occlusion, i.e. it is not possible to block the light of points that are hidden by other objects. So, every object displayed is transparent. In principle, this problem can be overcome by means of video-processing and possibly tracking of the position of the viewer's head or eyes.

A known embodiment of a volumetric display is shown in FIG. 1. The display consists of a transparent crystal 10 in which two lasers 11, 12 (or more) are scanning. At the position 15 of intersection of the laser beams 13, 14, light 16 may be generated by up-conversion, where photon emission at a higher energy occurs by absorption of multiple photons of lower energy (i.e. from the combined laser beams). This type of display is expensive and complicated. A special crystal 10 and two scanning lasers 11, 12 are required. In addition, up-conversion is not a very efficient, process.

An alternative embodiment of volumetric display 20 is shown in FIG. 2. This arrangement uses a material that can be switched between transparent and diffusive, such as polymer dispersed liquid crystal (PDLC) or liquid crystal gel (LC-gel). In a three-dimensional grid volume 21, cells 22 can be switched between these two states. Typically, the volume 21 is illuminated from one direction. In the illustration, the illumination source 23 is located below the grid volume. If a cell 22 is switched to a diffusive condition, light 24 is scattered in all directions.

One object of the present invention is to provide a volumetric three-dimensional image display device that overcomes some or all of the problems associated with prior art devices.

Another object of the present invention is to provide an apparatus suitable for adjusting an optical path length between two optical elements within a volumetric three-dimensional image display device.

A further object of the present invention to provide an optical path length adjuster for varying an optical path length between an input optical path and an output optical path.

Some or all of these objects may be achieved by embodiments of the invention as described herein.

According to one aspect, the present invention provides an optical path length adjuster for varying an optical path length between an input optical path and an output optical path, comprising:

a first polarisation switch for selecting a polarisation state for an input beam on the input optical path; and first and second beam splitters having at least two possible optical paths of different lengths therebetween, for passing the input beam along a selected one of said at least two possible optical paths according to the selected polarisation state of the input beam and for providing an output beam of light, on said optical output path, that has traveled along the selected optical path.

According to another aspect, the present invention provides a display device for generating a three-dimensional volumetric image, comprising:

a two-dimensional image display panel for generating a two-dimensional image;

a first focusing element for projecting the two-dimensional image to a virtual image in an imaging volume; and means for altering the effective optical path length between the display panel and the projecting first focusing element so as to alter the position of the virtual image within the imaging volume, wherein the means for altering the effective optical path length comprises the optical path length adjuster as defined above.

According to another aspect, the present invention provides a method for varying an optical path length between an input optical path and an output optical path of an optical path length adjuster, comprising the steps of:

selecting a polarisation state for an input beam of light on the input optical path using a first polarisation switch;

passing the input beam into a first beam splitter and along a selected one of at least two possible optical paths of different lengths according to the selected polarisation state of the input beam, the at least two possible optical paths extending between the first and a second beam splitter; and providing an output beam of light, from the second beam splitter, on said optical output path.

According to another aspect, the present invention provides a method for generating a three-dimensional volumetric image, comprising the steps of:

generating a two-dimensional image on a two-dimensional image display panel;

projecting the two-dimensional image to a virtual image in an imaging volume with a first focusing element; and altering the optical path length between the display panel and the projecting focusing element so as to vary the position of the virtual image within the imaging volume according to the path length adjusting method as defined above.

Embodiments of the present invention will now be described by way of example and with reference to the accompanying drawings in which.

Figure 1:
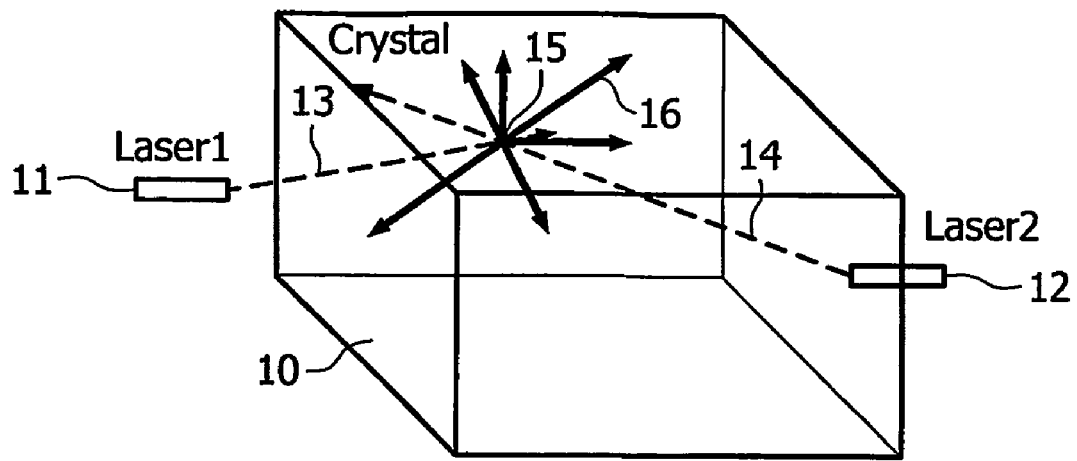
FIG. 1 shows a perspective schematic view of a volumetric display based on two scanning lasers and an up-conversion crystal.
Figure 2:
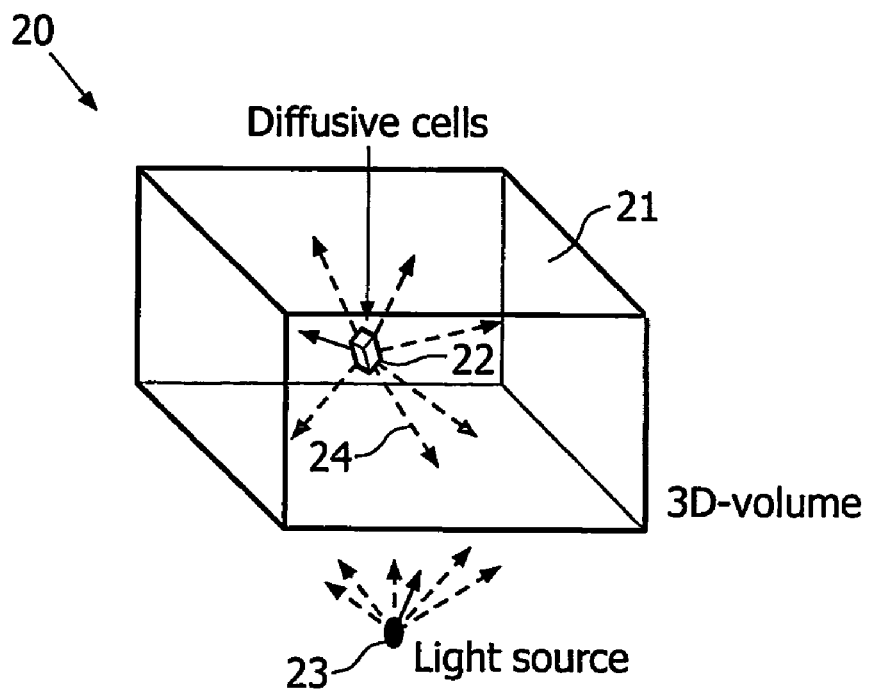
FIG. 2 shows a perspective schematic view of a volumetric display based on switchable cells of polymer dispersed liquid crystal or liquid crystal gel.
Figure 3A:
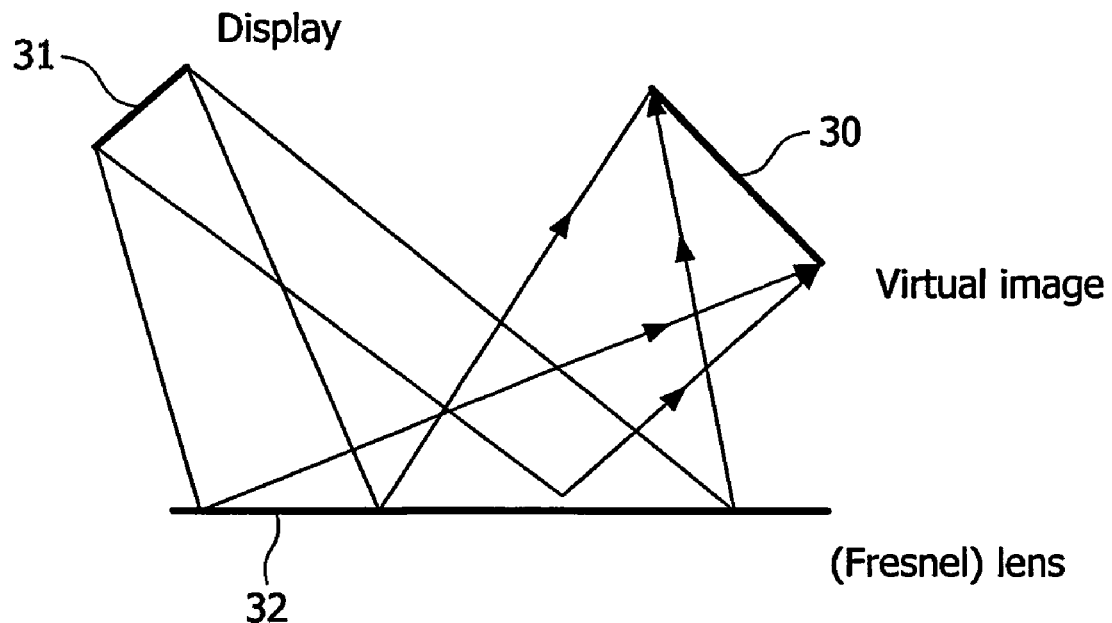
FIG. 3 is a schematic diagram useful in explaining the principles of a volumetric three-dimensional image display device in which the present invention may usefully be deployed.
Figure 3B:
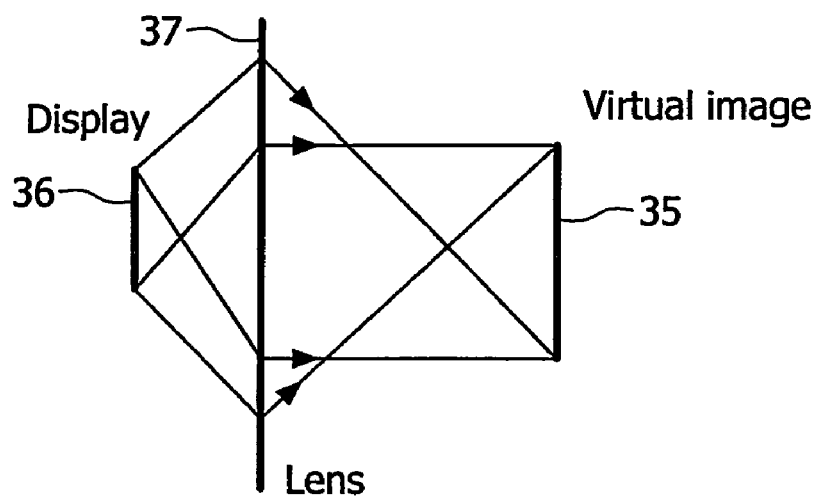

FIGS. 3a and 3b illustrate some basic principles used in a three-dimensional image display device. In FIG. 3a, a relatively large virtual image 30 of a small display panel 31 is provided by a Fresnel mirror 32. In FIG. 3b, a relatively large virtual image 35 of a small display panel 36 is provided by a Fresnel lens 37. The virtual image 30 or 35 appears in the air in front of the lens. A spectator can focus on this image 30 or 35 and observes that it is 'floating' in the air.

Figure 4A:
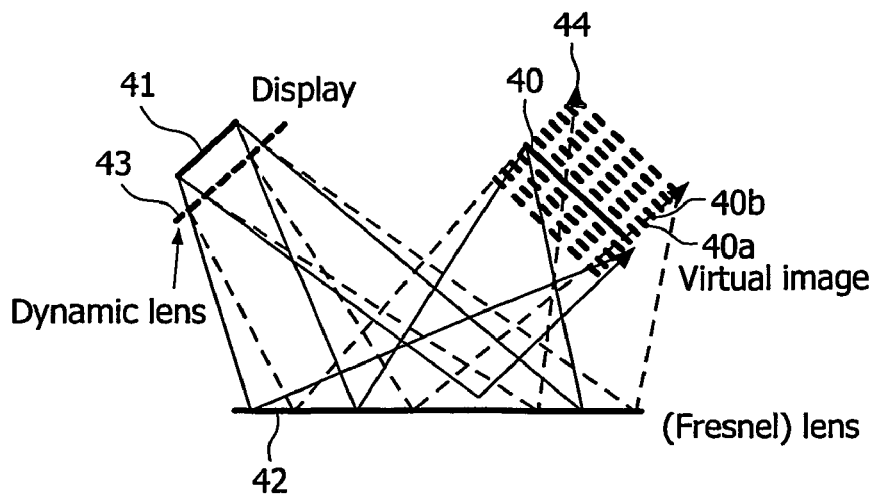
FIG. 4 is a schematic diagram illustrating volumetric three-dimensional image display devices comprising a display panel and an optical path length adjuster according to the present invention.
Figure 4B:
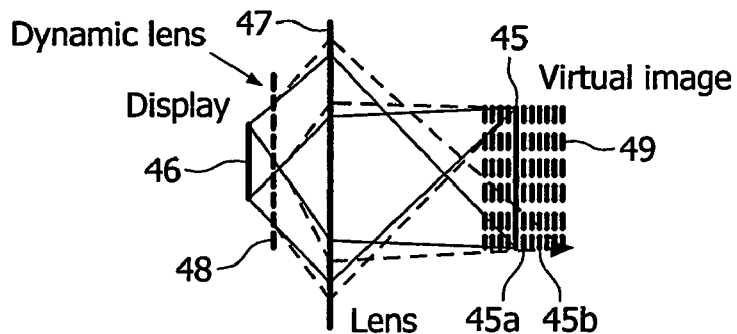

FIGS. 4a and 4b illustrate a modification to the arrangements of FIGS. 3a and 3b. As shown in FIG. 4a, the effective optical path length between the display panel 41 and the Fresnel mirror 42 is varied by the provision of a suitable effective path length adjuster 43. Similarly, as shown in FIG. 4b, the effective optical path length between the display panel 46 and the Fresnel lens 47 is varied by the provision of a suitable effective path length adjuster 48.

In one arrangement which is the subject of a separate patent application filed contemporaneously by the same applicant and entitled "Volumetric Display", the effective path length adjuster 43, 48 is a variable strength lens; in another arrangement in the same application, the effective path length adjuster is a mechanically-driven device which switches between two or more optical paths by physical movement of one or more optical elements.

The present invention, however, is directed toward electro-optically switching between two or more optical paths thereby avoiding a number of moving parts.

In a general sense, it will be noted that the mirror 42 or lens 47 may generally be replaced or implemented by any optical focusing element for projecting the two dimensional image of the display panel 41, 46 to a virtual image 40 or 45 located within an imaging volume 44 or 49. Preferably, the mirror 42 or lens 47 is a single or compound optical focusing element having a single focal length such that a planar display panel is imaged into a single plane of an imaging volume.

Figure 5:
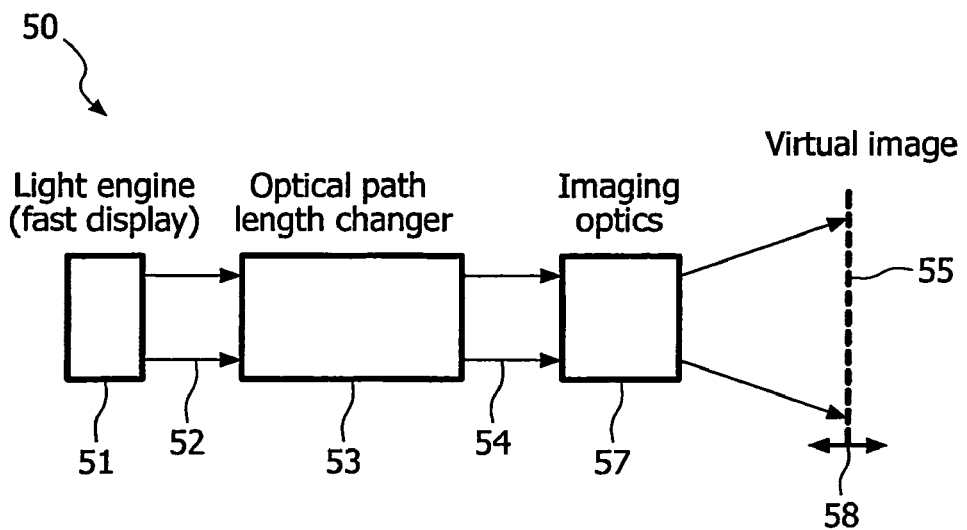
FIG. 5 is a schematic diagram of a volumetric three-dimensional image display device using an optical path length adjuster between a display panel and a focusing element.

FIG. 5 illustrates the basic components of the display device 50 according to the principles of FIG. 4. A two-dimensional display device or 'light engine' 51 provides an illumination source for imaging at an image plane 55. The light travels along an input optical path 52 to an optical path length adjuster 53, and from the optical path length adjuster 53 via output optical path 54 to a focusing element 57 (e.g. mirror 42 or lens 47) which projects the two dimensional image to plane 55.

Operation of the optical path length adjuster 53 effectively moves the depth position of the image plane 55 as indicated by arrow 58. The path length is preferably adjusted periodically at a 3D image display frame frequency. Typically this would be 50 or 60 Hz. Referring back to FIG. 4, during one 3D image frame period (e.g. 1/50 sec), the virtual image of the display panel 41 or 46 fills the imaging volume 44 or 49. Within the same frame period, the display panel may be driven to alter the image that is projected, so that different depths within the imaging volume 44 or 49 receive different virtual images.

It will be understood that in a preferred aspect, the path length adjuster 53 is effective to periodically sweep a substantially planar virtual image of the substantially planar two dimensional display panel through the imaging volume 44 or 49 at a 3D frame rate. Within that 3D frame period, the 2D image display panel displays a succession of 2D images at a 2D frame rate substantially higher than the 3D frame rate.

Therefore, at different planes 40a, 40b or 45a, 45b in the imaging volume 40, 45, different images are obtained so that a three-dimensional image of any object can be constructed.

The two-dimensional display panel may be any suitable display device for creating a two dimensional image. For example, this could be a poly-LED display or a projection display based on a digital micromirror device (DMD).

Preferably, the display panel is sufficiently fast to enable the generation of plural 2D images within one frame period of, e.g. 1/50 sec. For example, commercially available DMDs can reach speeds of 10,000 frames per second. If 24 two-dimensional frames are used to create colour and grey-scale effects and a 3D image refresh rate of 50 Hz is required, it is possible to create eight different image planes 40a, 40b, 45a, 45b in the imaging volume 44, 49.

Figure 6:
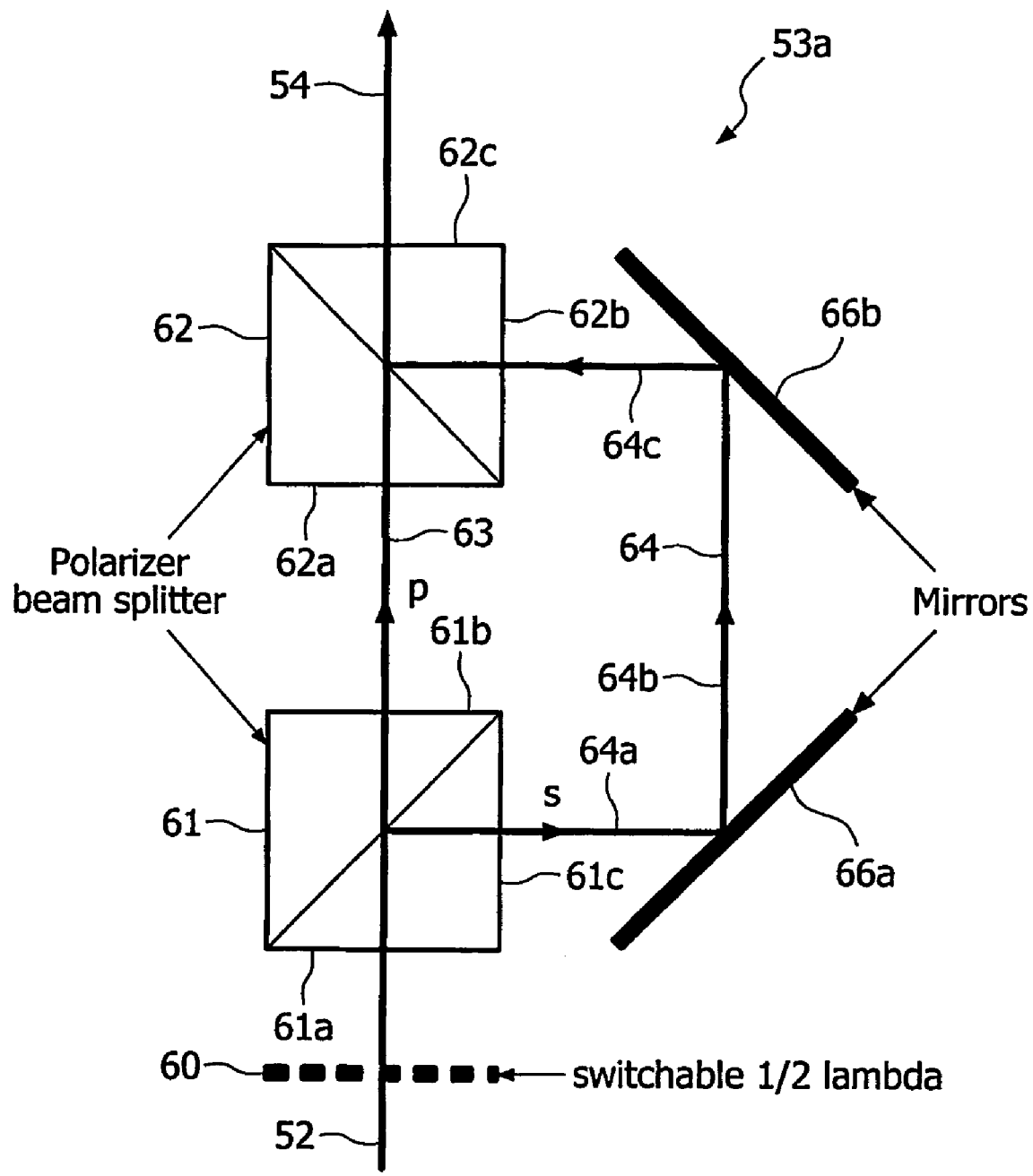
FIG. 6 is a schematic diagram of an optical path length adjuster offering two different path lengths.

With reference to FIG. 6, a first arrangement of optical path length adjuster 53a is described. The optical path length adjuster is based on polarising beam splitters and polarisation switches.

The adjuster comprises a first polarising beam splitter 61 and a second polarising beam splitter 62. A polarisation switch 60 is provided in front of the first beam splitter 61 in the input optical path 52. The expression 'polarisation switch' is used herein to encompass any suitable device for selecting for a specific polarisation state, e.g. a polarisation rotator that can be switched on and off, or into and out of the optical path. The polarisation switch may be a single cell liquid crystal panel with a twisted nematic 90 degree structure or a ferroelectric effect cell which allows a higher switching speed. The polarisation switch generally provides a polarised optical output in one of two possible polarisation states, according to an applied electric field. In another alternative, a polarisation switch could be implemented using a rotatable wheel with two alternative polarisers.

The first beam splitter 61 has a first input surface 61a, and first and second output surfaces 61b, 61c respectively. The second beam splitter 62 has first and second input surfaces 62a, 62b and an output surface 62c. A first optical path 63 extends directly between the first output surface 61*b* of the first beam splitter 61 and the first input surface 62*a* of the second beam splitter. A second optical path 64 (longer than the first optical path 63) extends between the second output surface 61*c* of the first beam splitter 61 and a second input surface 62*b* of the second beam splitter 62. The output surface 62*c* of the second beam splitter couples to the output optical path 54.

By means of the polarisation switch 60, it is possible to select between the two different optical paths 63, 64 as follows. Let us assume that we start with an input beam of polarised light on input path 52, for instance with polarisation state P. The two different paths 63, 64 can be selected as follows. Firstly, if the polarisation switch 60 is switched off, P-polarised light will enter the first splitter 61 and is not reflected therein, passing straight through to path 63. The same condition holds for the second splitter 62. So, in this polarisation state, light travels along a straight line through the adjuster 53*a*.

If the polarisation switch 60 is switched on, the P-polarised input light beam will be converted to S-polarised. This polarisation will enter the first splitter 61 and it will be reflected to the right onto optical path 64. In the second splitter 62 this light will be reflected again and leave the adjuster 53*a* along the output path 54. The two possible paths are shown in FIG. 7.

Figure 7:
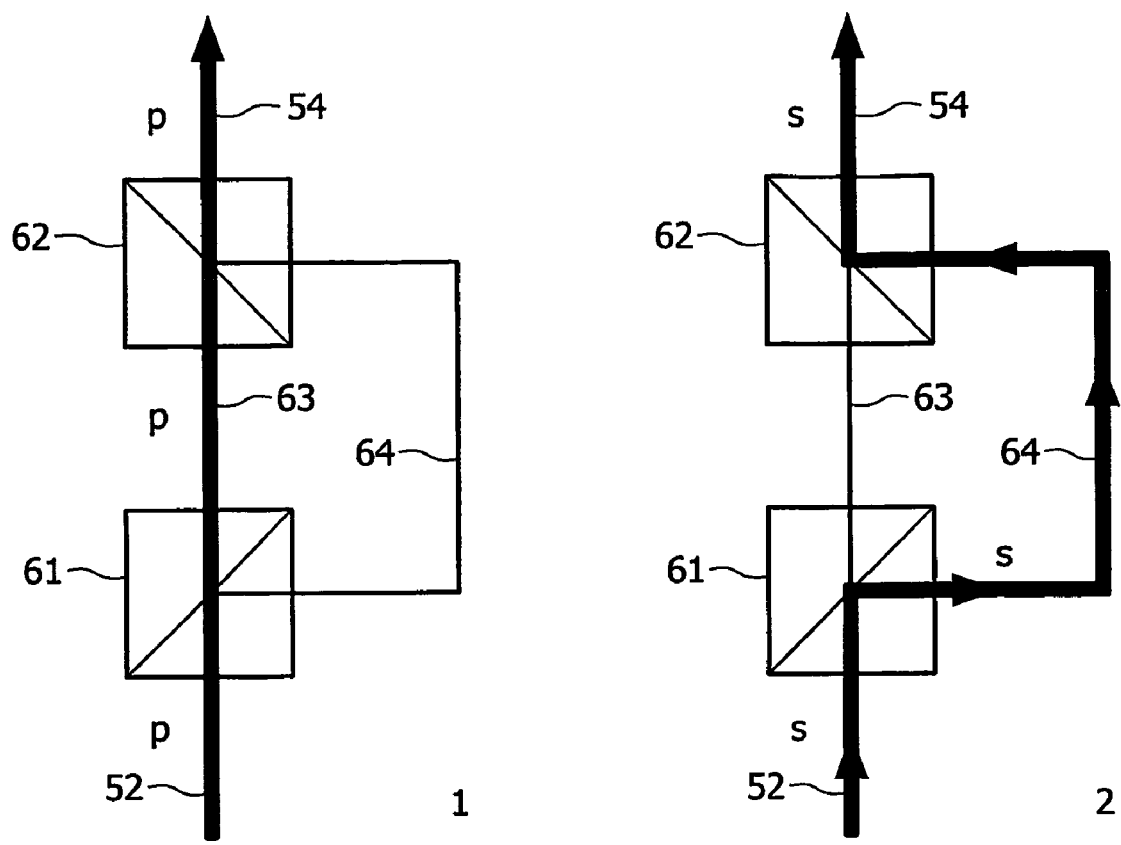
FIG. 7 is a schematic diagram illustrating the two different optical paths of the adjuster of FIG. 6.

In the configuration of FIGS. 6 and 7, it will be noted that the second optical path 64 comprises three path segments 64*a*, 64*b*, 64*c* separated by two mirrors 66*a*, 66*b*. In other arrangements, there could be more, or fewer path segments.

By means of this adjuster 53*a*, we can create two image planes 55 in a volumetric display device 50.

Figure 8:
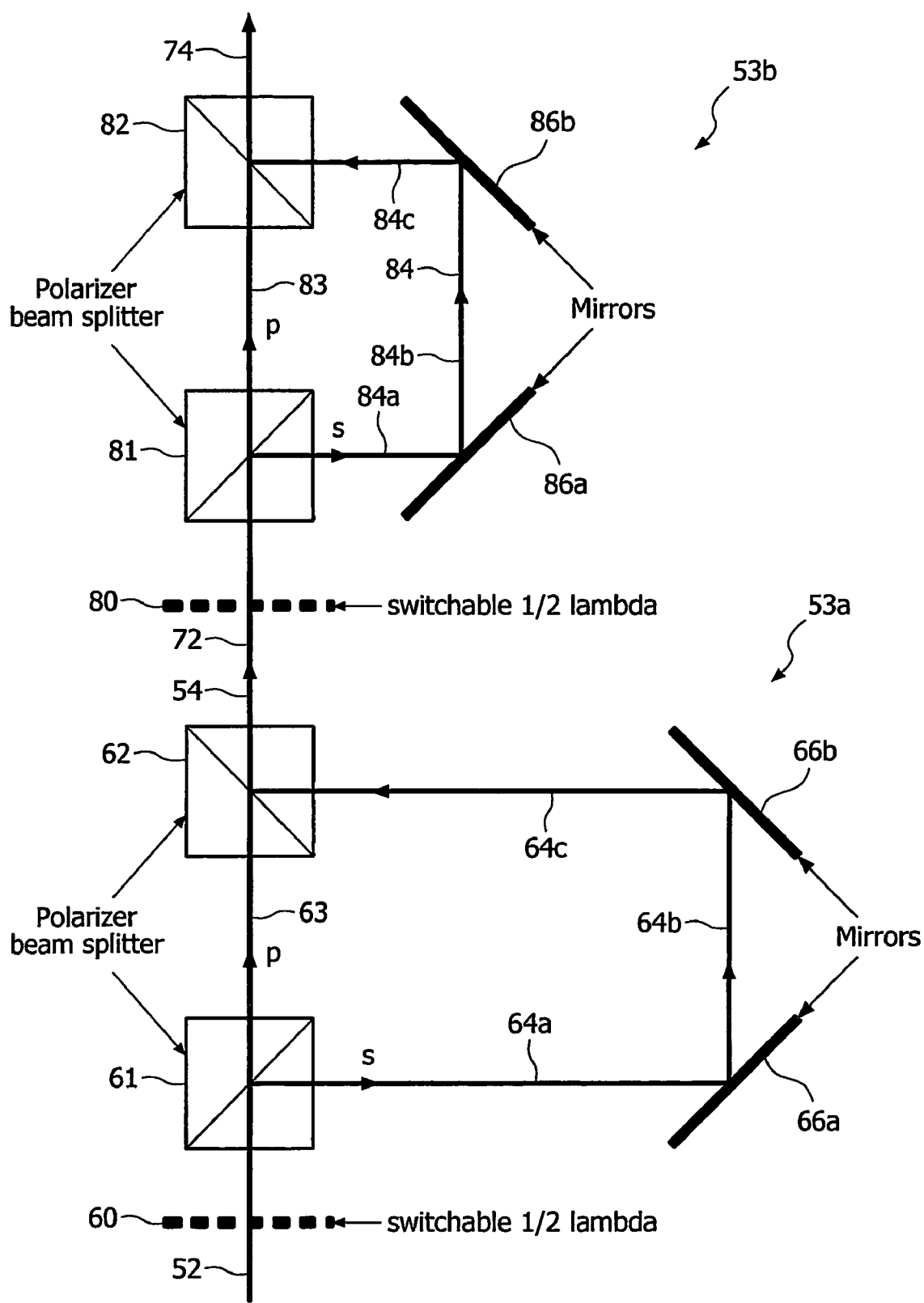
FIG. 8 is a schematic diagram of a cascaded optical path length adjuster deploying a series combination of adjusters as in FIG. 6.

Several planes can be created by means of more than one adjuster 53*a*, 53*b* in a cascade arrangement, as shown in FIG. 8. Preferably, the path lengths for each part of the cascade are different such that different combinations of path length can be created. For instance, the first adjuster 53*a* of the cascade has path lengths 63 and 64 and the second adjuster has path lengths 83 and 84. It is possible to form path lengths of 63+83, 63+84, 64+83 and 64+84.

Preferably, each of the beam splitters 61, 62 is configured so that the second optical path comprises a number of segments that are transverse to the input path. This could also be the case where the beam splitters are not rectangular. In the preferred embodiment shown, the beam splitters are rectangular and the two segments 64*a* and 64*c* are substantially orthogonal to the input path 52.

Figure 9:
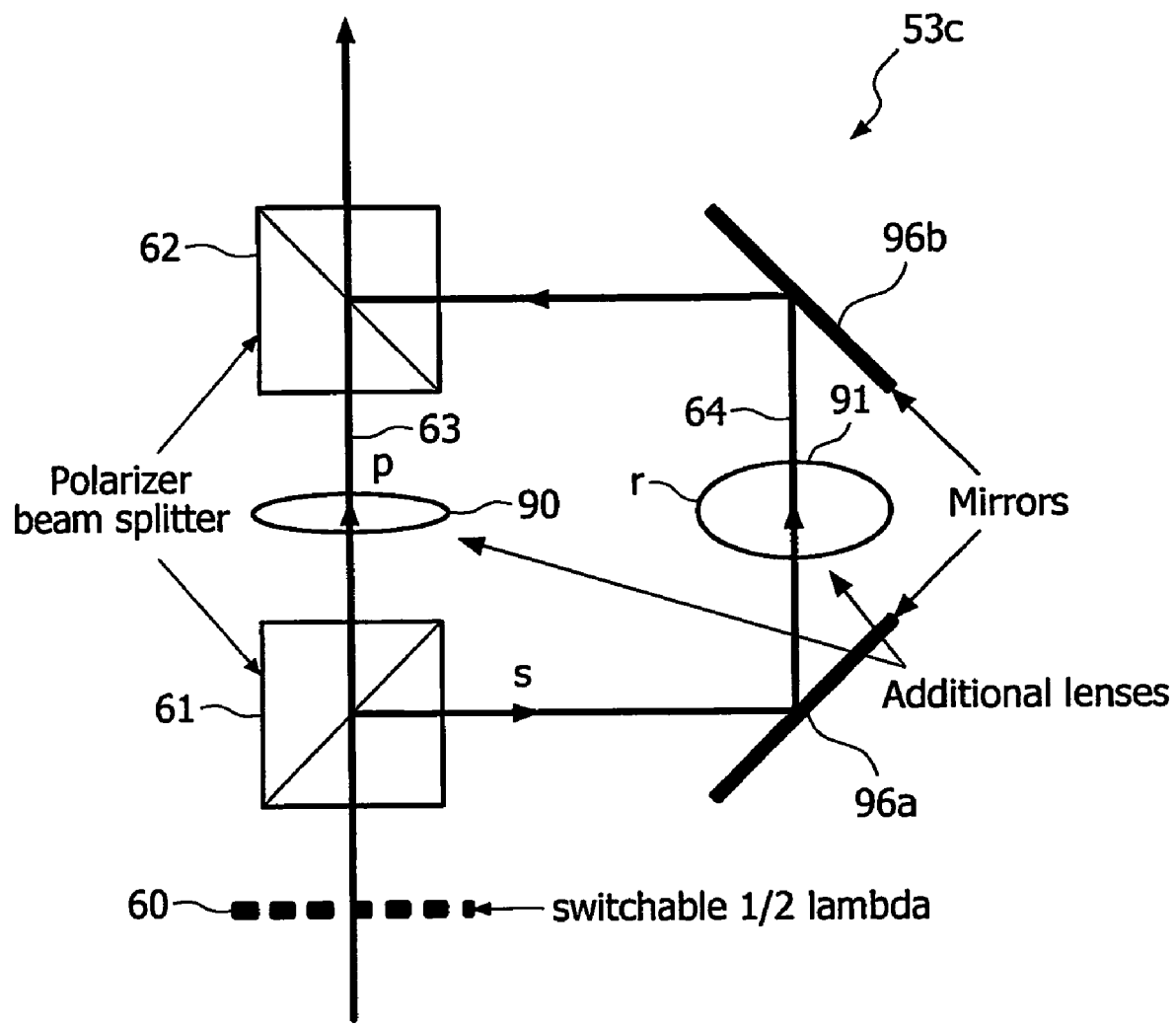
FIG. 9 is a schematic diagram of the adjuster of FIG. 6 further including additional lenses for correcting image sizes.

In practice, additional optical components may be desirable to ensure that the light beam fits within the working dimensions of the splitters 61, 62. With reference to FIG. 9, an optical path length adjuster 53*c* includes, between each splitter 61, 62 on each of the optical paths 63, 64, further optical elements such as lenses 90, 91. The strength of the lenses 90, 91 need not necessarily be the same and may adjust image size according to prevailing factors. It will be recognised that other focusing elements could be used. For example, some focusing power in the optical path 64 could be implemented by way of focusing mirrors 96*a*, 96*b*.

The different optical paths 63, 64 might result in brightness differences due to absorption coefficients of the polarisation switches 60, 80 and/or splitters 61, 62, 81, 82. This absorption could be compensated for by the intensity of light engine display 51, e.g. corrected electronically in a video signal supplied thereto.

Figure 10:
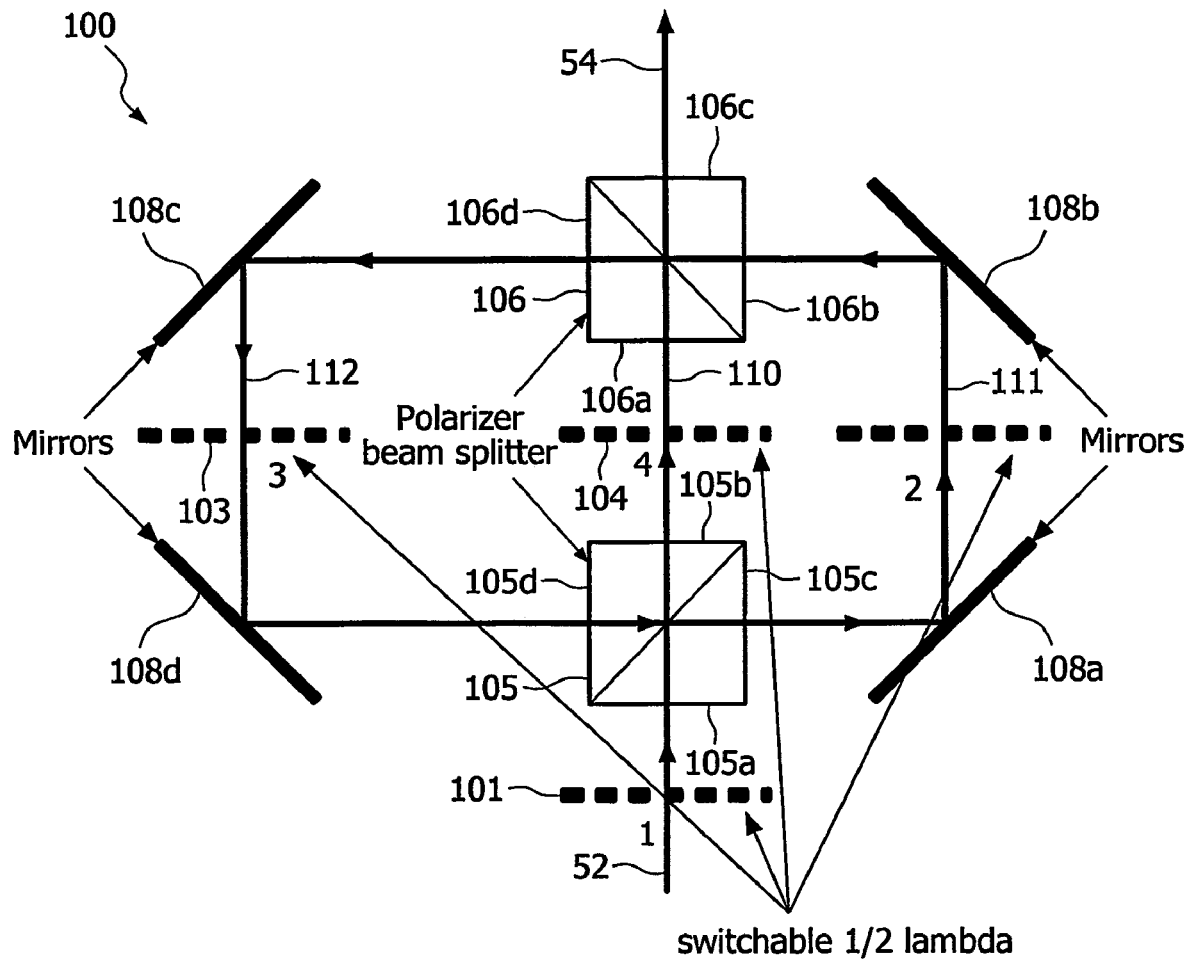
FIG. 10 is a schematic diagram of a folded multi-path optical path length adjuster offering eight different optical paths with seven different path lengths.

A more sophisticated path length adjuster 100 is shown in FIG. 10. By means of four polarisation switches 101, 102, 103, 104 and just two polarising beam splitters 105, 106 it is possible to increase the number of different optical paths to seven. This is a particularly advantageous construction since large polarising beam splitters are relatively expensive.

Similar to the arrangement of FIG. 6, the input optical path 52 is directed to a first input surface 105*a* of the first beam splitter 105. The output optical path 54 is coupled to a first output surface 106*c* of the second beam splitter 106.

The first beam splitter 105 has first and second input surfaces 105*a* and 105*d*, and first and second output surfaces 105*b* and 105*c*. The second beam splitter 106 has first and second input surfaces 106*a* and 106*b*, and first and second output surfaces 106*c* and 106*d*. An array of mirrors 108*a*, 108*b*, 108*c*, 108*d* fold the various optical path segments to appropriate input surfaces of the beam splitters as shown. A first optical path 110 exists between the output surface 105*b* and the input surface 106*a*. A second optical path 111 exists between the output surface 105*c* and the input surface 106*b*. A third optical path 112 exists between the output surface 106*d* and the input surface 105*d*. Each of the input surfaces 105*a*, 106*b*, 105*d* and 106*a* is associated with a respective one of the polarisation switches 101, 102, 103, 104.

In principle there are sixteen different states in which the four polarisation switches can be deployed. Several of these states actually result in the same path for a light beam entering the adjuster. It can be shown that there are eight different paths and of these eight paths, seven have a different total path length. All the possible states are denoted in the table below. The path is denoted by the number of the polarisation switch ('1'=switch 101, '2'=switch 102, '3'=switch 103 and '4'=switch 104) through which the light beam passes. The switch state ('0' or '1') indicates whether the polarisation state is left unchanged (='0') or altered/rotated through 90 degrees (='1').

| switch ID | | | | |
|---|---|---|---|---|
| 1 | 2 | 3 | 4 | optical path |
| 0 | 0 | 0 | 0 | 1 —> 4 |
| 1 | 0 | 0 | 0 | 1 —> 2 |
| 0 | 1 | 0 | 0 | 1 —> 4 |
| 1 | 1 | 0 | 0 | 1 —> 2 —> 3 —> 2 |
| 0 | 0 | 1 | 0 | 1 —> 4 |
| 1 | 0 | 1 | 0 | 1 —> 2 |
| 0 | 1 | 1 | 0 | 1 —> 4 |
| 1 | 1 | 1 | 0 | 1 —> 2 —> 3 —> 4 —> 3 —> 2 |
| 0 | 0 | 0 | 1 | 1 —> 4 —> 3 —> 4 |
| 1 | 0 | 0 | 1 | 1 —> 2 |
| 0 | 1 | 0 | 1 | 1 —> 4 —> 3 —> 4 |
| 1 | 1 | 0 | 1 | 1 —> 2 —> 3 —> 2 |
| 0 | 0 | 1 | 1 | 1 —> 4 —> 3 —> 2 —> 3 —> 4 |
| 1 | 0 | 1 | 1 | 1 —> 2 |
| 0 | 1 | 1 | 1 | 1 —> 4 —> 3 —> 2 |
| 1 | 1 | 1 | 1 | 1 —> 2 —> 3 —> 4 |

The first row shows that all the polarisation switches are set to leave the polarisation state unaltered and that the light beam passes through polarisation switches 1 and 4 (101, 104) and then to the output path 54. Thus, optical path 110 is traversed. Many of the possible states result in the same path.

Figure 11:
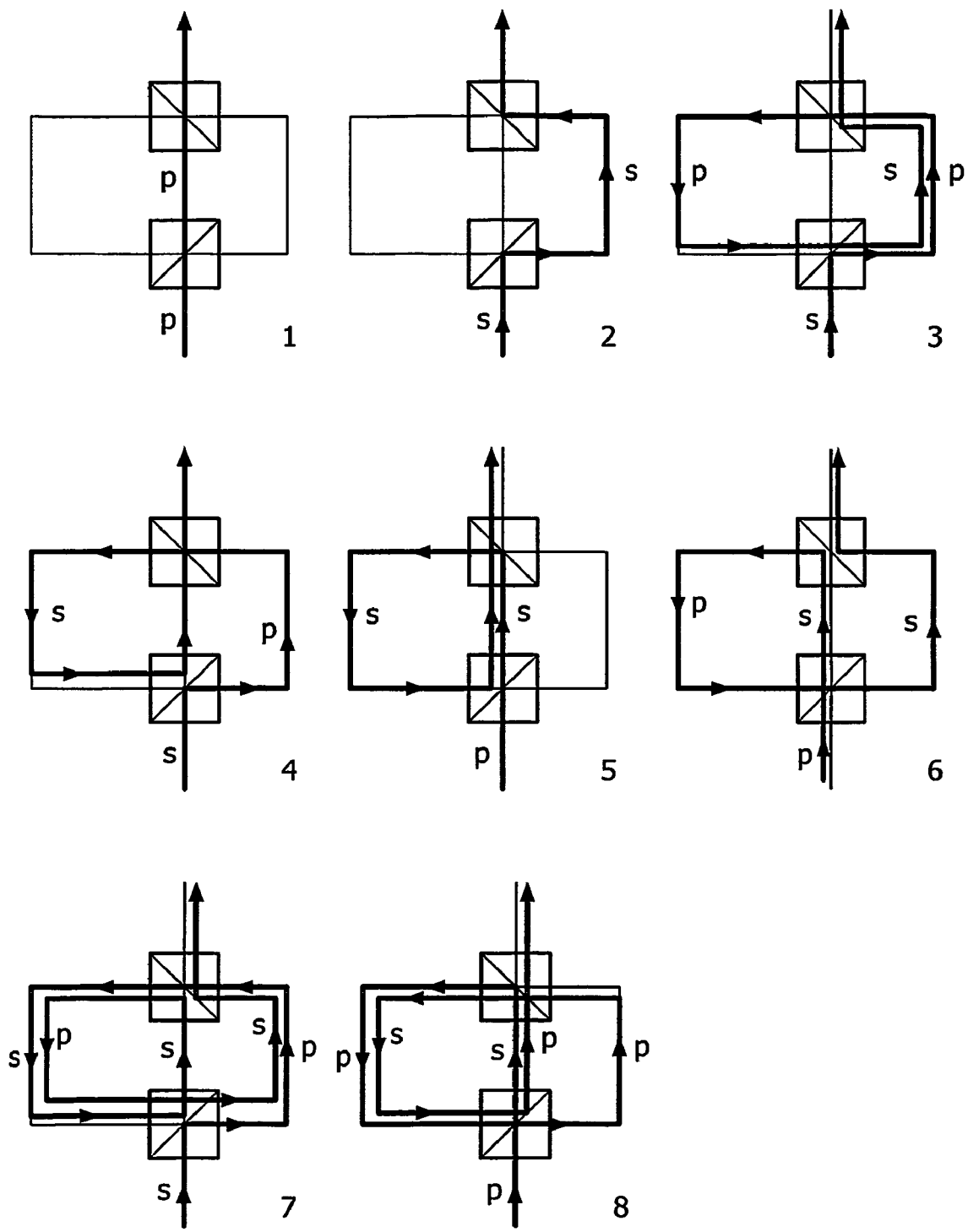
FIG. 11 is a schematic diagram illustrating the eight different optical paths of the adjuster of FIG. 10.

The eight different cumulative paths are shown in FIG. 11. Note that the cumulative paths 4 and 6 have the same path length, in that all three paths 110, 111 and 112 are traversed. All other cumulative paths have a different length if the lengths of paths 111 and 112 are configured to be different (as shown). In total there are seven different optical path lengths possible with this construction.

It is also possible to use several of the adjusters 100 in a cascade arrangement, as discussed in connection with FIG. 8. In addition, extra lenses might also be required to keep the beam within the working area of each beam splitter, as discussed in connection with FIG. 9.

Figure 12:
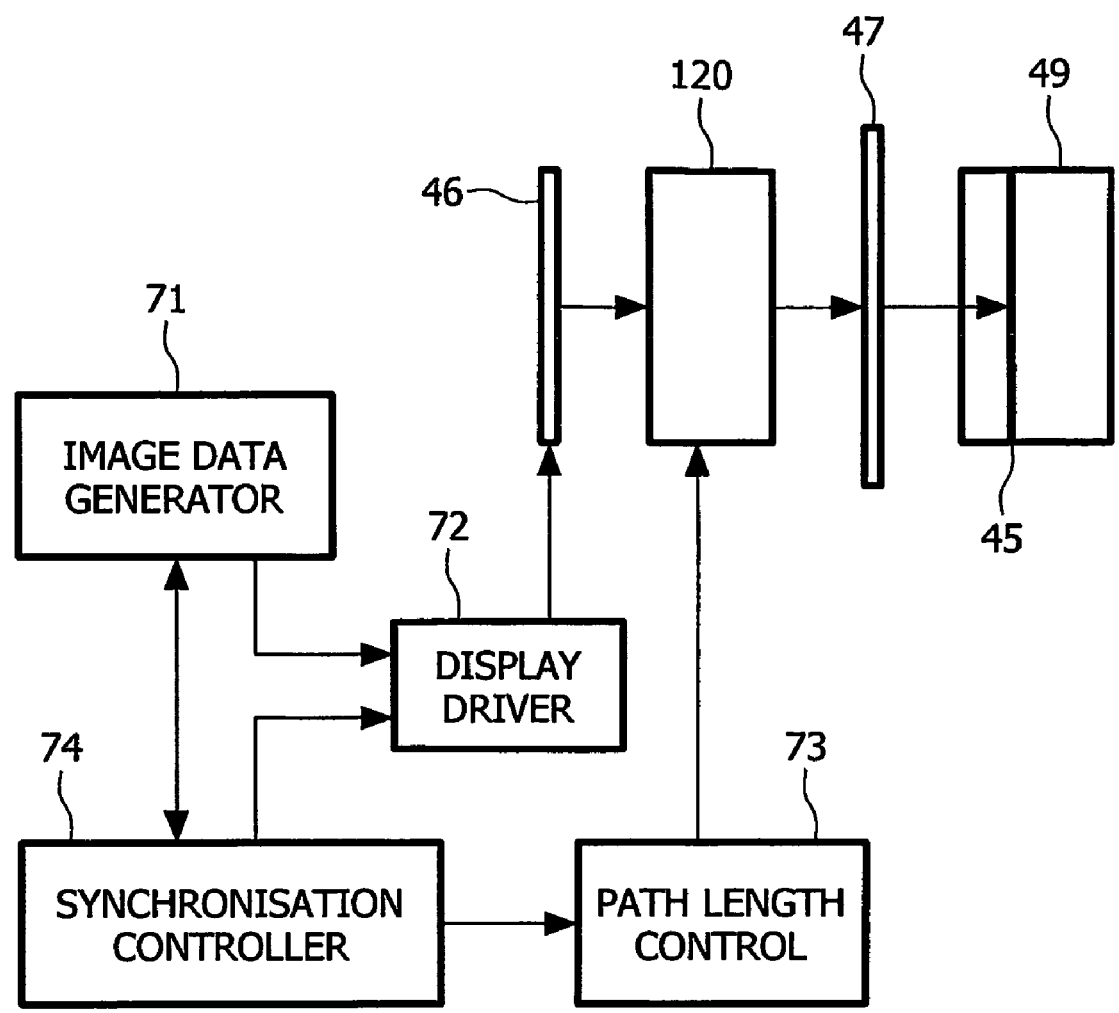
FIG. 12 is a schematic functional block diagram of a control system for the display device of FIG. 5.

With reference to FIG. 12 a schematic view of an overall volumetric image display device using the optical path length adjusters described herein, together with control system, is shown. The path length adjuster 120 (e.g. adjuster 53, 53*a*, 53*b*, 100 as described earlier) interposed between the 2D display panel 46 and focusing element 47 is controlled by path length control circuit 73. Path length control circuit provides drive signals to each of the polarisation switches, e.g. 60, 101, 102, 103, 104. A display driver 72 receives 2D frame image data from image generator 71. Display of the succession of 2D images is synchronised with the path length controller operation by way of a synchronisation circuit 74.

Although a principal and important use for the path length adjusters as described herein is in the application of a volumetric three dimensional image display device, it will be recognised that the adjusters may have use in other optical instruments and devices, where it is necessary or desirable to facilitate the electro-optical switching of an optical path length between two optical elements. Such an arrangement avoids the need for moving parts as the path length can be varied by way of electrical control signals to each of the polarisation switches.

Other embodiments are intentionally within the scope of the accompanying claims.

The invention claimed is:

1. An optical path length adjuster for varying an optical path length between an input optical path and an output optical path, comprising:
   a first polarisation switch for selecting a polarisation state for an input beam on the input optical path; and
   first and second beam splitters having at least two possible optical paths of different lengths therebetween, for passing the input beam along a selected one of said at least two possible optical paths according to the selected polarisation state of the input beam and for providing an output beam of light, on said optical output path, that has travelled along the selected optical path;
   the first beam splitter has a first optical input coupled to the optical output of the first polarisation switch, for diverting light at the optical input of the first splitter to first and second optical outputs respectively according to a polarisation state of the light at the optical input of the first splitter;
   the second beam splitter has first and second optical inputs respectively optically coupled to the first and second outputs of the first beam splitter, via respective said first and second optical paths, the second beam splitter diverting light at the first and second inputs to first and second outputs of the second beam splitter according to a polarisation state of light at the first and second inputs thereof;
   the first output of the second beam splitter defines the optical output path, and the second output of the second beam splitter is optically coupled to a second input of the first beam splitter via a third optical path;
   each of the first, second and third optical paths respectively includes one of a second, a third and a fourth polarisation switch,
   the first, second, third and fourth polarisation switches adapted to thereby select cumulative combinations of one or more of said first, second, and third optical paths between the input optical path and the output optical path.

2. The apparatus of claim 1 in which a first one of said possible optical paths extends directly between a first output surface of the first beam splitter and a first input surface of the second beam splitter, and a second one of said possible optical paths extends between a second output surface of the first beam splitter and a second input surface of the second beam splitter, via additional optical elements.

3. The apparatus of claim 2 in which the additional optical elements include mirrors.

4. The apparatus of claim 2 in which the second optical path includes at least two path segments that are transverse to the input path.

5. The apparatus of claim 4 in which the second optical path includes at least two path segments that are orthogonal to the input path.

6. The apparatus of claim 1 in which at least one of the possible optical paths includes a focusing element therein.

7. The apparatus of claim 6 in which all of the possible optical paths include a focusing element therein.

8. The apparatus of claim 6 in which the focusing elements include lens elements each adapted to constrain an image dimension being transmitted along the respective optical path to fit within the optics of the associated beam splitter.

9. The apparatus of claim 1 combined with at least one further optical path length adjuster of any preceding claim in a cascade formation, such that the output optical path of the first said optical path length adjuster forms the input path of a successive said further optical path length adjuster.

10. The apparatus of claim 9 in which the second optical paths of each said optical path length adjuster include different optical path lengths such that a plurality of possible overall optical path lengths are selectable by appropriate selection of path length within each said optical path length adjuster.

11. The apparatus of claim 1 in which at least some of the possible optical paths include a further polarisation switch therein, each further polarisation switch operative to select a subsequent possible optical path or the output optical path.

12. A display device for generating a three-dimensional volumetric image, comprising:
   a two-dimensional image display panel for generating a two-dimensional image;
   a first focusing element for projecting the two-dimensional image to a virtual image in an imaging volume; and
   means for altering the effective optical path length between the display panel and the projecting first focusing element so as to alter the position of the virtual image within the imaging volume, wherein the means for altering the effective optical path length comprises the optical path length adjuster according to claim 1.

13. A method for varying an optical path length between an input optical path and an output optical path of an optical path length adjuster, comprising the steps of:
   selecting a polarisation state for an input beam of light on the input optical path using a first polarisation switch;
   passing the input beam into a first beam splitter and along a selected one of at least two possible optical paths of different lengths according to the selected polarisation state of the input beam, the at least two possible optical paths extending between the first and a second beam splitter; and
   providing an output beam of light, from the second beam splitter, on said optical output path;
   wherein the first beam splitter has a first optical input coupled to the optical output of the first polarisation switch, for diverting light at the optical input of the first splitter to first and second optical outputs respectively according to a polarisation state of the light at the optical input of the first splitter;

wherein the second beam splitter has first and second optical inputs respectively optically coupled to the first and second outputs of the first beam splitter, via respective said first and second optical paths, the second beam splitter diverting light at the first and second inputs to first and second outputs of the second beam splitter according to a polarisation state of light at the first and second inputs thereof;

wherein the first output of the second beam splitter defines the optical output path, and the second output of the second beam splitter is optically coupled to a second input of the first beam splitter via a third optical path; and wherein each of the first, second and third optical paths respectively includes one of a second, a third and a fourth polarisation switch.

14. The method of claim 13 further including the step of causing the light to traverse a plurality of additional optical elements on the second one of said possible optical paths when the second optical path is selected.

15. The method of claim 14 in which the plurality of additional optical elements traversed include mirrors.

16. The method of claim 14 in which the light on said second optical path traverses at least two path segments that are transverse to the input path.

17. The method of claim 16 in which the light on said second optical path traverses at least two path segments that are orthogonal to the input path.

18. The method of claim 13 further including the step of passing the light on at least one of the possible optical paths through a focusing element therein.

19. The method of claim 18 further including the step of passing the light on all of the possible optical paths through a focusing element therein.

20. The method of claim 18 further including adapting the focusing elements to constrain an image dimension being transmitted along the respective optical path to fit within the optics of the associated beam splitter.

21. The apparatus of claim 13 further including passing light from the output path to an input path of a downstream optical path length adjuster and repeating the steps for adjusting the optical path length.

22. The method of claim 21 further including the step of selecting different optical path lengths within each said optical path length adjuster.

23. The method of claim 13 further including the step of selecting a subsequent optical path by way of a further polarisation switch within a selected optical path.

24. The method of claim 23 further including the step of selecting cumulative combinations of one or more of first, second, and third optical paths between the first and second beam splitters using a polarisation switch within each of said first, second and third optical paths.

25. A method for generating a three-dimensional volumetric image, comprising the steps of:
generating a two-dimensional image on a two-dimensional image display panel;
projecting the two-dimensional image to a virtual image in an imaging volume with a first focusing element; and
altering the optical path length between the display panel and the projecting focusing element so as to vary the position of the virtual image within the imaging volume according to the method of claim 13.

* * * * *